United States Patent
Tsai et al.

(10) Patent No.: US 7,499,130 B2
(45) Date of Patent: Mar. 3, 2009

(54) LIQUID CRYSTAL DISPLAY PANEL AND METHOD OF FABRICATING THE SAME

(75) Inventors: Cheng-Yeh Tsai, Taipei County (TW); Wei-Chou Chen, Hsinchu (TW); Chih-Yung Wan, Hsinchu (TW); Ming-Tien Lin, Taipei County (TW)

(73) Assignee: Hannstar Display Corporation, Taipei (TW)

( * ) Notice: Subject to any disclaimer, the term of this patent is extended or adjusted under 35 U.S.C. 154(b) by 583 days.

(21) Appl. No.: 10/904,520

(22) Filed: Nov. 15, 2004

(65) Prior Publication Data
US 2005/0151900 A1    Jul. 14, 2005

Related U.S. Application Data

(63) Continuation-in-part of application No. 10/709,431, filed on May 5, 2004, now abandoned.

(30) Foreign Application Priority Data
Jan. 14, 2004    (TW) ................................ 93100862 A

(51) Int. Cl.
*G02F 1/1333*    (2006.01)

(52) U.S. Cl. ....................................................... 349/110
(58) Field of Classification Search .................. None
See application file for complete search history.

(56) References Cited

U.S. PATENT DOCUMENTS

| | | | |
|---|---|---|---|
| 5,615,030 A * | 3/1997 | Harada et al. | 349/110 |
| 5,739,880 A * | 4/1998 | Suzuki et al. | 349/110 |
| 2002/0051106 A1 * | 5/2002 | Nagashima et al. | 349/110 |

* cited by examiner

*Primary Examiner*—David Nelms
*Assistant Examiner*—Lucy P Chien
(74) *Attorney, Agent, or Firm*—Jianq Chyun IP Office

(57) ABSTRACT

A liquid crystal display panel having a display area comprises a first substrate, a second substrate, a sealant, a liquid crystal layer, and a light-shielding layer. The sealant is disposed between the first substrate and the second substrate. The liquid crystal layer is disposed in a space defined by the first substrate, the second substrate and the sealant. The light shielding layer is disposed on a first outer surface of the first substrate or a second outer surface of the second substrate, wherein the light shielding layer and the display area are not overlapped. In addition, the liquid crystal display panel further comprises a protection layer. Since the protection layer encapsulates the light-shielding layer, out-diffusion of dye within the light-shielding layer is effectively prevented.

19 Claims, 7 Drawing Sheets

LIQUID CRYSTAL DISPLAY PANEL AND METHOD OF FABRICATING THE SAME

CROSS-REFERENCE TO RELATED APPLICATION

This application is a continuation-in-part of a prior application Ser. No. 10/709,431, filed May 5, 2004 which claims the priority benefit of Taiwan application serial no. 93100862, filed on Jan. 14, 2004.

BACKGROUND OF THE INVENTION

1. Field of the Invention

The present invention relates to a liquid crystal display panel and a method of fabricating the same, and more particularly, to a liquid crystal display and a method of fabricating the same capable of reducing light leakage at edges of bezel of a liquid crystal display module.

2. Description of Related Art

Liquid Crystal Display (LCD) has such advantages as small size, low weight, low driving voltage, low power consumption, and portability and has been applied in the display of the portable terminal system for the past twenty years and become an indispensable item for modern life.

A One Drop Fill (ODF) process is adapted for mass producing a large-panel LCD display in which amount of the liquid crystal can be properly controlled for reducing the fabrication costs. Further, the ODF process is capable of substantially reducing the process time of filling the liquid crystal. Therefore, the ODF process can be meaningfully applied for mass-production LCD display.

In a typical ODF process, an ultraviolet-curable glue (UV-curable glue) is coated on a thin film transistor array substrate or on a color filter substrate to define a sealed area. Then the liquid crystal is dropped into the sealed area. The thin film transistor array substrate is attached to the color filter substrate. Finally, the resulting structure is exposed to, for example, an UV light, for curing the UV-curable glue and thereby bonding the substrates.

FIG. 1 is a cross-sectional view showing a conventional liquid crystal display module formed by using the ODF process. For simplification, FIG. 1 shows only the essential elements of an LCD display. With reference to FIG. 1, the liquid crystal display module comprises at least a thin film transistor array substrate 102, a color filter substrate 104, a black matrix layer 106, a sealant 108, a liquid crystal layer 110, polarizers 112 and 114, and a bezel 116. The black matrix layer 106 is disposed on the color filter substrate 104. The sealant 108 is disposed between the thin film transistor array substrate 102 and the color filter substrate 104. The liquid crystal layer 110 is disposed in the sealed space defined by the thin film transistor array substrate 102, the color filter substrate 104 and the sealant 108. The polarizers 112 and 114 are separately disposed over the outer surfaces of the color filter substrate 104 and the thin film transistor array substrate 102 such that the polarizers 112 and 114 do not contact the liquid crystal layer 110. The bezel 116 encloses a liquid crystal cell including the thin film transistor array substrate 102, the color filter substrate 104, the black matrix layer 106, the sealant 108, the liquid crystal layer 110 and the polarizers 112 and 114.

The sealant 108 is cured by exposing the sealant 108 to the UV light during the ODF process, and therefore it is important to ensure that the black matrix layer 106 does not block the sealant 108 when performing the UV exposure. Moreover, the ODF process requires that the black matrix layer 106 over the color filter substrate 104 should be separated from the sealant 108 with a predetermined distance as shown in FIG. 1.

Today, the process of fabricating the liquid crystal display panel/module should fit the Standard Panel Work Group (SPWG) specification. Although the LCD display is being fabricated using the ODF process fitting the SPWG specification, light leakage 120 will invariably occur at the edges of the bezel 116 at about the view angle 45° as shown in the magnified view of part A.

In order to shield the leakage light, some prior arts proposed to extend the black matrix layer 106 more to the side. But to fit the design rule of the ODF process, the dimension of the liquid crystal cell must be increased. Accordingly, the electronic products having the liquid crystal cell cannot satisfy the SPWG specification.

SUMMARY OF THE INVENTION

Accordingly, the present invention is directed to a liquid crystal display panel and a fabrication method thereof capable of reducing the light leakage of the liquid crystal display module.

The present invention is also directed to a liquid crystal display panel and a fabrication method thereof using the ODF process fitting the SPWG specification. Further, the light leakage of the liquid crystal display module fabricated using the ODF process can be reduced.

According to an embodiment of the present invention, the liquid crystal display panel comprises at least a first substrate, a second substrate, a sealant, a liquid crystal layer and a light-shielding layer. The first substrate has a first inner surface and a first outer surface. The second substrate has a second inner surface and a second outer surface and is disposed above the first substrate. The sealant is disposed between the first substrate and the second substrate. The liquid crystal layer is disposed in a space defined by the first inner surface of the first substrate, the second inner surface of the second substrate and the sealant. The light-shielding layer is disposed on the first outer surface of the first substrate and/or the second outer surface of the second substrate, wherein the light-shielding layer and the display area are not overlapped.

According to an embodiment of the present invention, the method of fabricating the liquid crystal display panel is provided. First, a first substrate having a first inner surface and a first outer surface and a second substrate having a second inner surface and a second outer surface are provided. Next, a sealant is formed between the first inner surface of the first substrate and the second inner surface of the second substrate. Then a liquid crystal layer is filled into a space defined by the first inner surface of the first substrate, the second inner surface of the second substrate and the sealant. The first substrate is attached to the second substrate, and the sealant is exposed to a light. Thereafter, a light-shielding layer is formed on the first outer surface of the first substrate and/or the second outer surface of the second substrate such that the light leakage is effectively prevented.

According to an embodiment of the present invention, the material of the light-shielding layer comprises, for example but not limited to, ink, such as black ink, deep-colored ink, or any other ink.

According to an embodiment of the present invention, the optical density of the light-shielding layer is, for example but not limited to, 2.0 or more than 2.0.

According to an embodiment of the present invention, the light-shielding layer is disposed over a peripheral area outside the display area. For example, the light-shielding layer is disposed on the first outer surface of the first substrate and/or the second outer surface of the second substrate.

According to an embodiment of the present invention, the light-shielding layer and the black matrix layer are partially overlapped, for example. Furthermore, the light-shielding layer and the sealant are partially overlapped.

According to an embodiment of the present invention, the liquid crystal display panel further comprises a first polarizer, a second polarizer and a protection layer. The first polarizer is disposed on the first outer surface. The second polarizer is disposed on the second outer surface. The protection layer is disposed between the first polarizer and the light-shielding layer when the light-shielding layer is disposed on the first outer surface of the first substrate. In another embodiment of the present invention, the liquid crystal display panel further comprises a first polarizer, a second polarizer and a protection layer. The first polarizer is disposed on the first outer surface. The second polarizer is disposed on the second outer surface. The protection layer is disposed between the second polarizer and the light-shielding layer when the light-shielding layer is disposed on the second outer surface of the first substrate. Moreover, the light-shielding layer is encapsulated by the protection layer, for example.

According to an embodiment of the present invention, the first substrate is, for example, a thin film transistor array substrate, and the second substrate is, for example, a color filter substrate. In another embodiment of the present invention, the first substrate is, for example, a color filter on thin film transistor array substrate (COA substrate), and the second substrate is, for example, an opposite substrate having a common electrode.

According to an embodiment of the present invention, the light-shielding layer is formed on the substrate of the liquid crystal display panel. When the liquid crystal display panel is applied in an electronic product, the light-shielding layer is capable of reducing the light leakage at the bezel edges of the liquid crystal display module.

According to an embodiment of the present invention, the light-shielding layer is formed on the substrate after the sealant is cured. Therefore, the liquid crystal display panel can be fabricated by using the ODF process fitting the SPGW specification. Furthermore, the light leakage of the liquid crystal display module fabricated using the ODF process can be reduced.

One or part or all of these and other features and advantages of the present invention will become readily apparent to those skilled in this art from the following description wherein there is shown and described an embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

DESCRIPTION OF EMBODIMENTS

First Embodiment

FIGS. 2A-2D are cross-sectional views showing progressive steps of an ODF process of fabricating a liquid crystal display panel according to the first embodiment of the present invention. For simplification, the figures show only the essential elements.

Figure 1:
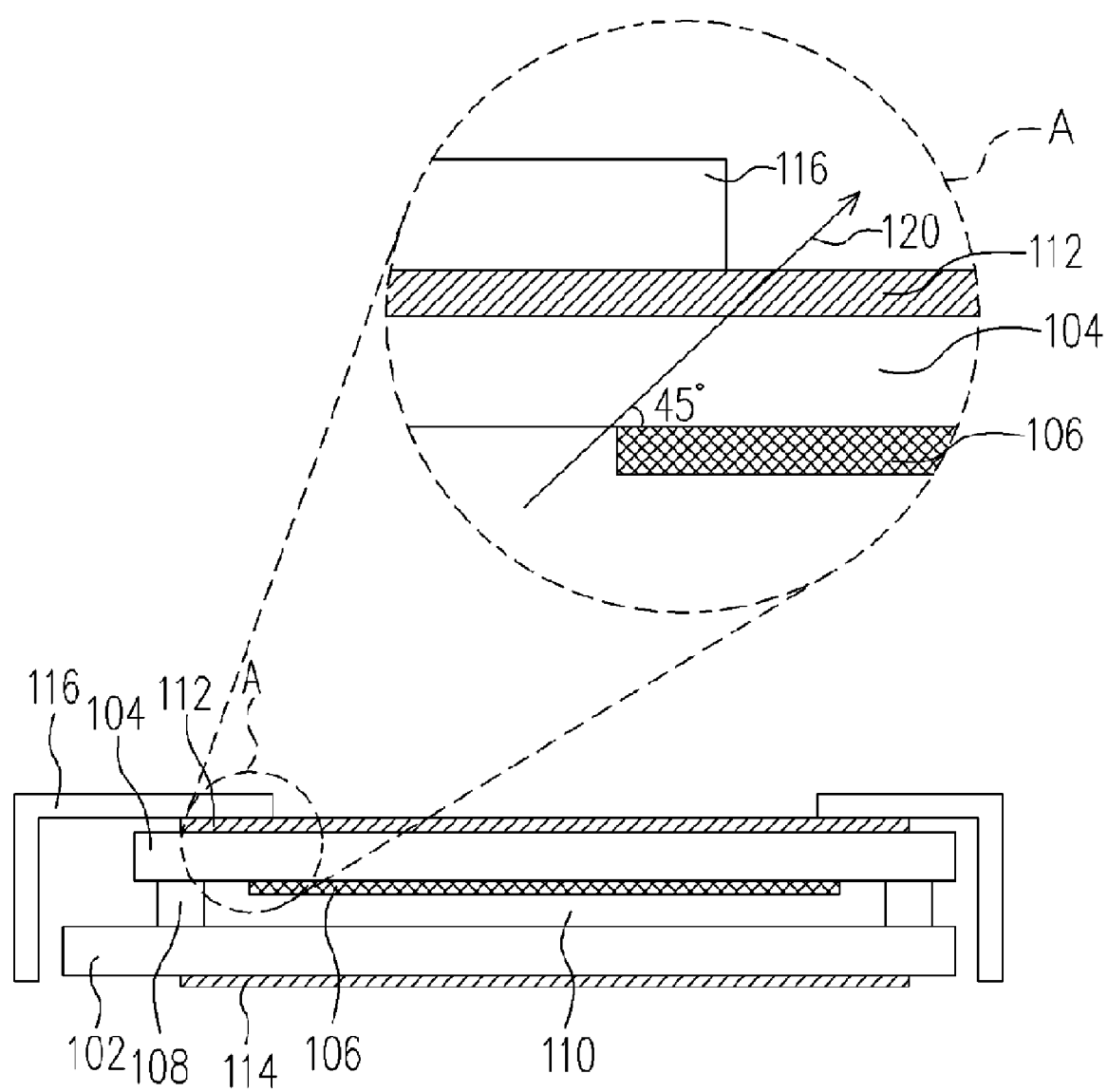
FIG. 1 is a cross-sectional view showing a conventional liquid crystal display module fabricated by using an ODF process.
Figure 2A:
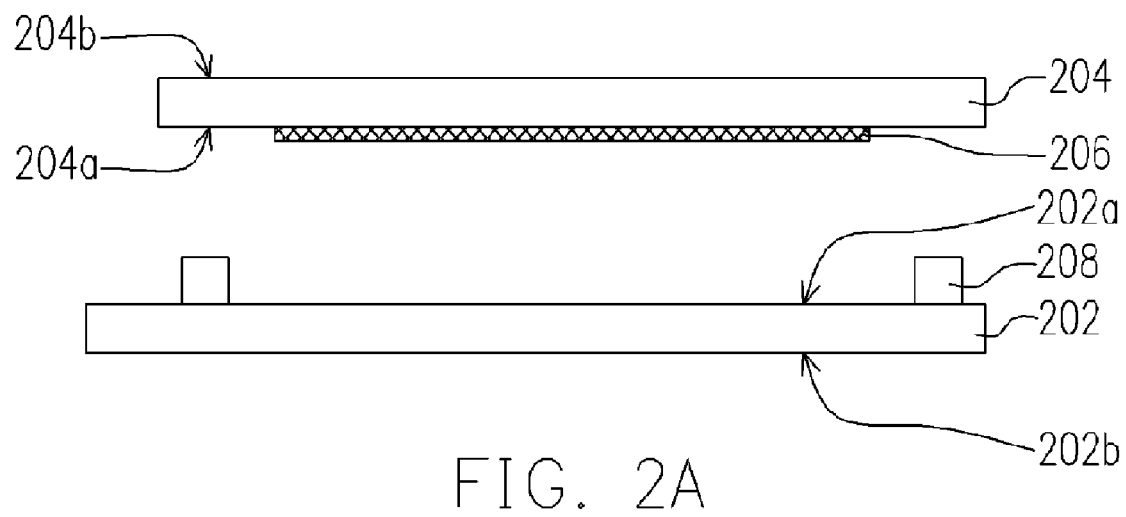
FIGS. 2A-2D are cross-sectional views showing progressive steps of an ODF process of fabricating a liquid crystal display panel according to the first embodiment of the present invention.

With reference to FIG. 2A, a first substrate 202, such as a plastic substrate or a glass substrate, is provided. The first substrate 202 has a first inner surface 202a and a first outer surface 202b. Next, a plurality of thin film transistors, scan lines, data lines and pixel electrodes (not shown) are formed over the first inner surface 202a of the substrate 202 to consist a thin film transistor array substrate. For example, the transistors may be a-Si TFTs, Poly-Si TFTs, or the like. In addition, the transistors may be top gate TFTs or bottom gate TFT. In other words, each transistor may be a top gate TFT having an a-Si channel layer, a bottom gate TFT having an a-Si channel layer, a top gate TFT having a Poly-Si channel layer, or a bottom gate TFT having a Poly-Si channel layer.

A second substrate 204, such as a plastic substrate or a glass substrate, is provided. The second substrate 204 has a second inner surface 204a and a second outer surface 204b. A plurality of color filter films (not shown) are formed, for example, on the second substrate 204. Then a black matrix layer 206 is formed on the second inner surface 204a of the second substrate 204 to consist a color filter substrate. The sealant 208 is formed between the first substrate 202 and the second substrate 204. More specifically, the sealant is coated on the first inner surface 202a of the first substrate 202 or the second inner surface 204a of the second substrate 204 to define a sealed area (not shown). In an embodiment of the present invention, the sealant 208 can be, for example but not limited to, a radiation-curable glue, such as an ultraviolet-curable glue.

Figure 2B:
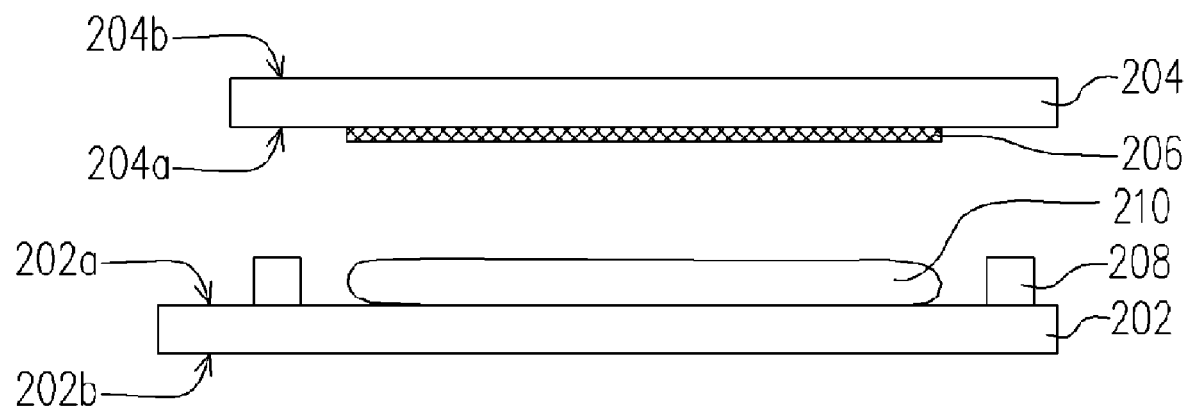
Figure 2C:
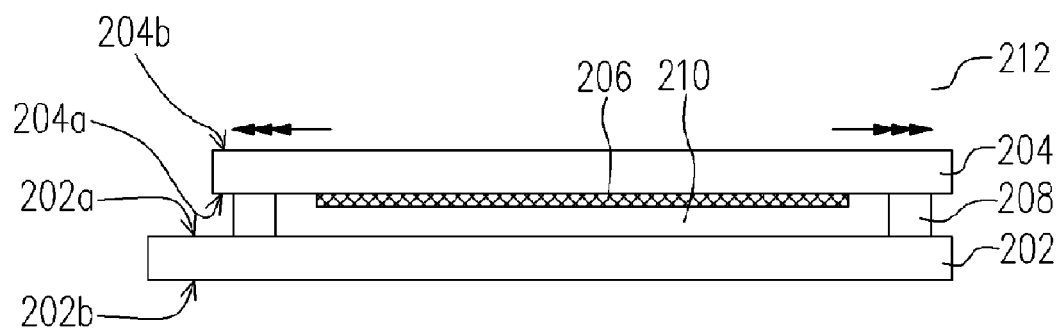

With reference to FIG. 2B, liquid crystal is dropped into the sealed area to form a liquid crystal layer 210. With reference to FIG. 2C, the first substrate 202 is attached to the second substrate 204. Then UV light 212 is applied through the edges of the second substrate 204 to cure the sealant 208, and thereby attaching the first substrate 202 onto the second substrate 204.

Figure 2D:
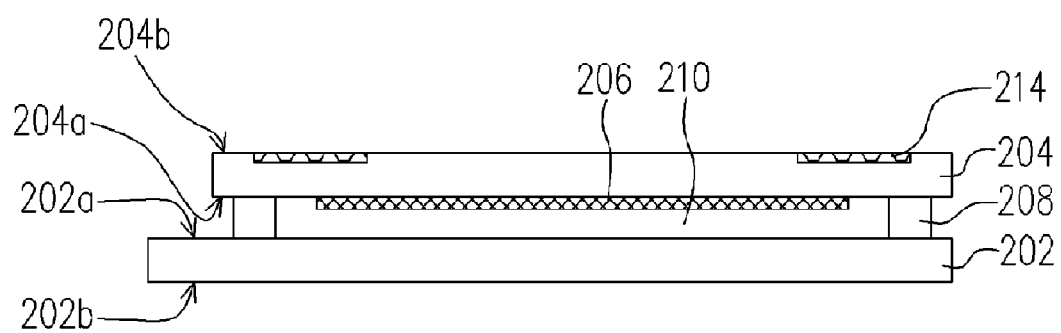
Figure 3:
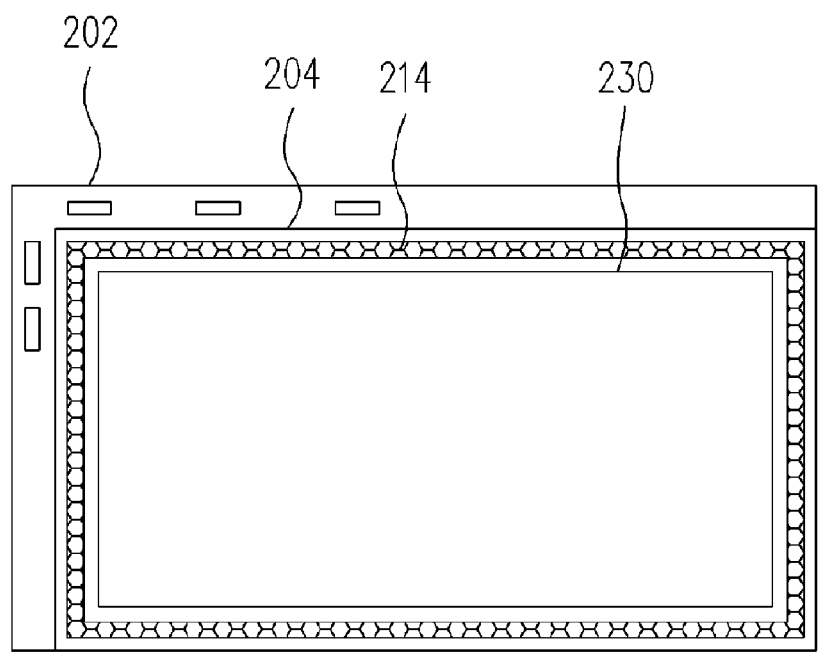
FIG. 3 is a top view of the liquid crystal display panel shown in FIG. 2D.

Please refer to FIGS. 2D and 3, wherein FIG. 3 is a top view of the liquid crystal display panel shown in FIG. 2D. A light-shielding layer 214 is formed on the second outer surface 204b of the second substrate 204 such that the light-shielding layer 214 does not contact the liquid crystal layer 210. As shown in FIG. 3, the light-shielding layer 214 is disposed on a peripheral area outside the display area 230 of the liquid crystal display panel. In an embodiment of the present invention, the light-shielding layer 214, for example, surrounds the display area 230 and has a frame shape. Thereafter, a liquid crystal display panel comprising the light-shielding layer 214 is fabricated according to the process described with reference to FIGS. 2A-2D.

According to an embodiment of the present invention, the light-shielding layer 214 is formed by using materials, for example, having an optical density of about 2.0 or higher than 2.0. The material of the light-shielding layer 214 comprises, for example but not limited to, black ink, deep-colored ink or any other ink, which can be formed, for example, by using an ink jet printing method, a screen printing method or a gravure printing method. Moreover, according to an embodiment of the present invention, the light-shielding layer 214 is capable of shielding the light.

Figure 4:
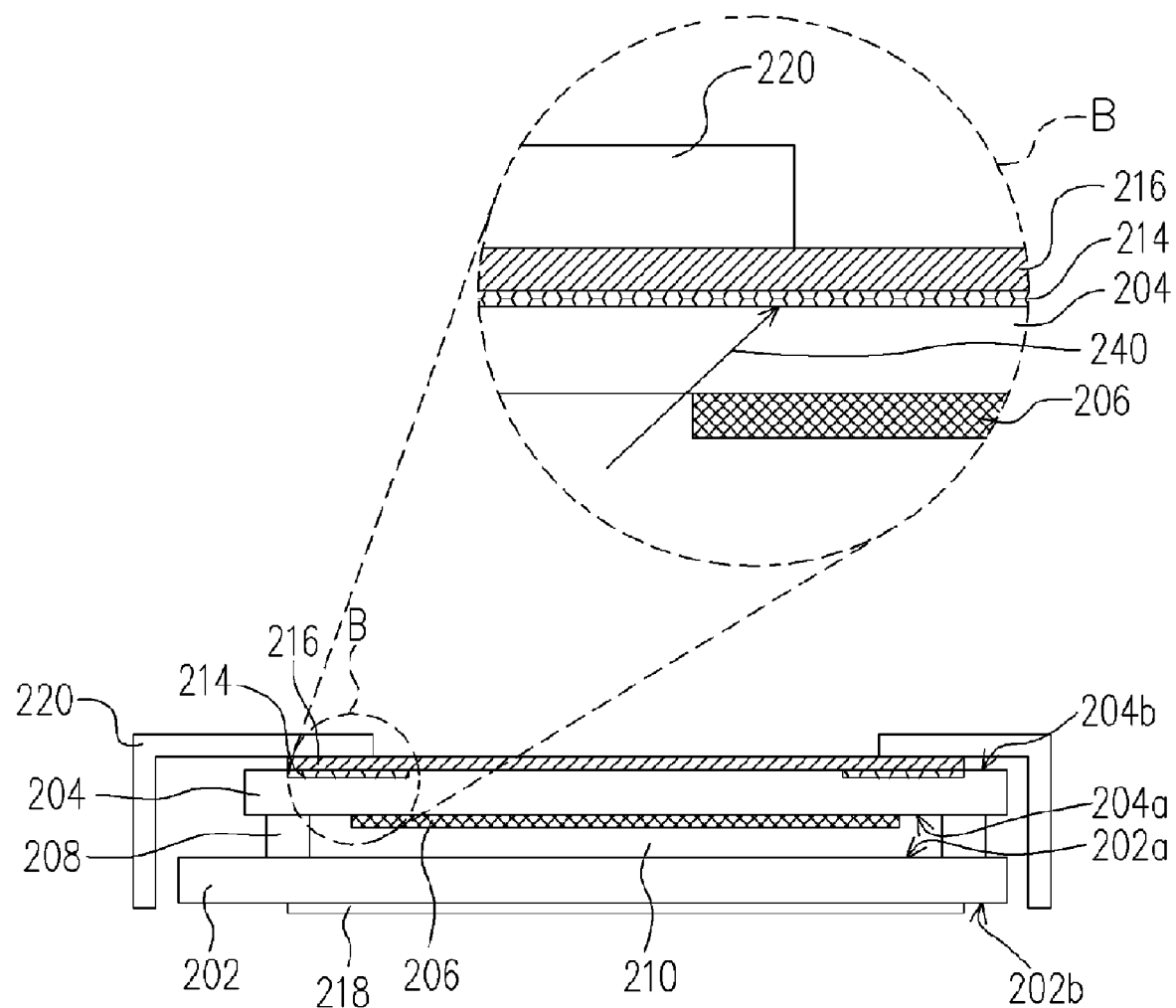
FIG. 4 is a cross-sectional view showing a liquid crystal display module fabricated using an ODF process according to the first embodiment of the present invention.

FIG. 4 is a cross-sectional view showing a liquid crystal display module fabricated using an ODF process according to the first embodiment of the present invention. For simplification, FIG. 4 shows only the essential elements. With reference to FIG. 4, the liquid crystal display module comprises the liquid crystal display panel of FIG. 2D, polarizers 216 and 218, and a bezel 220. The liquid crystal display panel comprises the first substrates 202, the second substrate 204, the black matrix layer 206, the sealant 208, the liquid crystal layer 210 and the light-shielding layer 214.

According to an embodiment of the present invention, the black matrix layer 206 is disposed on the second inner surface 204a of the second substrate 204, the sealant 208 is disposed between the first substrate 202 and the second substrate 204. The liquid crystal layer 210 is disposed in the sealed space defined by the first substrate 202, the second substrate 204 and the sealant 208. The light-shielding layer 214 is disposed on the second outer surface 204b of the second substrate 204 such that the light-shielding layer 214 does not contact the liquid crystal layer 210. The light-shielding layer 214 is disposed on the peripheral area outside the display area (not shown) of the liquid crystal display panel. The optical density of the light-shielding layer 214 is, for example but not limited to, 2.0 or higher than 2.0. The material of the light-shielding layer 214 can be, for example but not limited to, ink and the ink can be, for example but not limited to, deep-colored ink, black ink or any other ink.

According to an embodiment of the present invention, the light-shielding layer 214 may overlap the edge of black matrix layer 206 to reduce the light leakage. Besides, the light-shielding layer 214 and the sealant 208 are also partially overlapped, for example. In other words, the light-shielding layer 214 is disposed on the second substrate 204 such that at least a portion of the black matrix layer 206 and/or the sealant 208 is exposed.

With reference to FIG. 4, the polarizers 218 and 216 are disposed on the first outer surface 202b of the first substrate 202 and the second outer surface 204b of the second substrate 204, respectively. More specifically, the polarizer 216 is disposed over the second substrate 204 to cover the light-shielding layer 214. The bezel 220 encloses a liquid crystal cell including the first substrate 202, the second substrate 204, the black matrix layer 206, the sealant 208, the liquid crystal layer 210, the light-shielding layer 214 and the polarizers 216 and 218.

When the exemplary liquid crystal display panel comprising the light-shielding layer 214 of FIG. 2D is applied to the liquid crystal display module, the light leakage 240 can be shielded by the light-shielding layer 214 disposed on the second outer surface 204b of the second substrate 204 (as shown in the magnified view of part B). Therefore, the light leakage 240 at the edges of bezel 220 in the liquid crystal display module can be effectively reduced.

Second Embodiment

Figure 5:
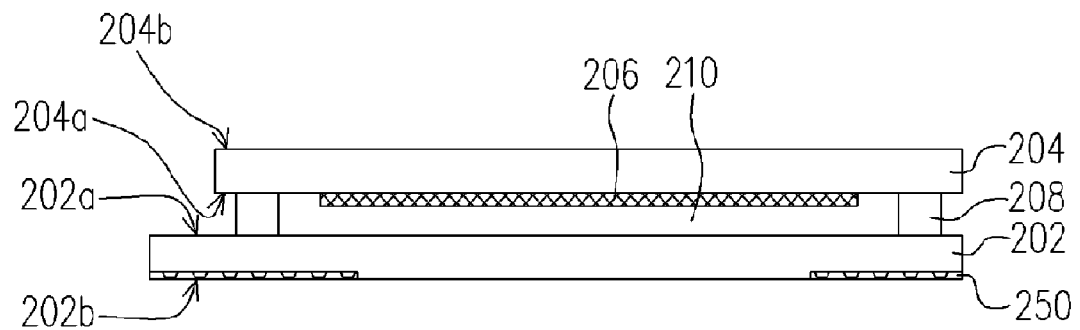
FIG. 5 is a cross-sectional view showing a liquid crystal display panel fabricated using an ODF process according to the second embodiment of the present invention.

In the embodiment described above, the light-shielding layer 214 is disposed on the second outer surface 204b of the second substrate 204 (for example, the color filter substrate). However, the present invention present is not limited to the embodiment described above. FIG. 5 is a cross-sectional view showing a liquid crystal display panel formed using an ODF process according to the second embodiment of the present invention. The elements of the liquid crystal display panel in FIG. 5 are similar to the liquid crystal display panel in FIG. 2 with the same reference numbers and thus detailed descriptions thereof is not repeated hereinafter.

Furthermore, the structure of the liquid crystal display panel in FIG. 5 is similar to that in FIG. 2D except that the light-shielding layer 250 is disposed on the first outer surface 202b of the first substrate 202 (for example, the thin film transistor array substrate). The liquid crystal display panel can be fabricated using the process steps with reference to FIGS. 2A-2C described above. Further, the light-shielding layer 250 can be fabricated using a process similar to that used for fabricating the light-shielding layer 214 shown in FIG. 2D. The light-shielding layer 250 can be, for example, disposed on the peripheral area outside the display area 230 of the liquid crystal display panel. In this embodiment, the light-shielding layer 250, for example, surrounds the display area 230 and is in a shape of a frame.

Figure 6:
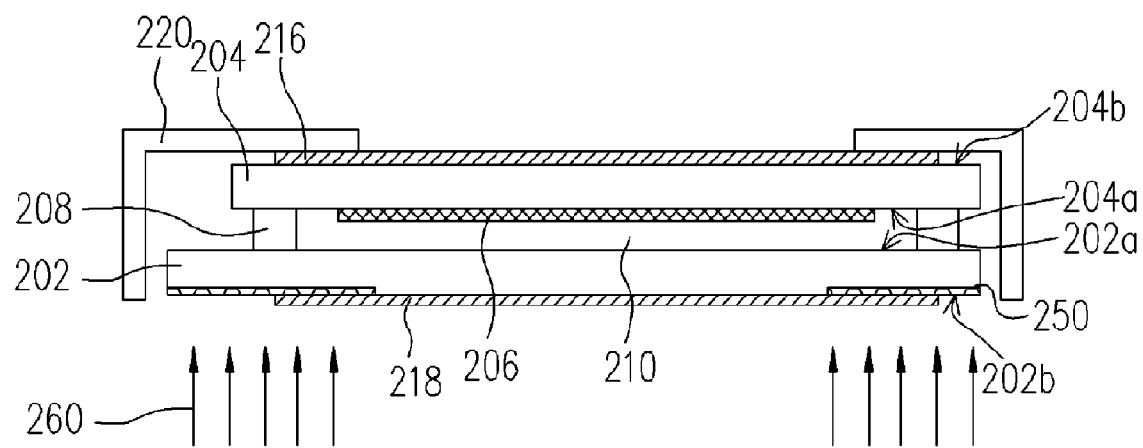
FIG. 6 is a cross-sectional view showing a liquid crystal display module fabricated using an ODF process according to the second embodiment of the present invention.

FIG. 6 is a cross-sectional view showing a liquid crystal display module fabricated using an ODF process according to the second embodiment of the present invention. In this embodiment, the liquid crystal display panel shown in FIG. 5 is utilized to fabricate the liquid crystal display module. It should be noted that elements of the liquid crystal display panel in FIG. 6 are similar to those in FIG. 4 and have the same reference numbers and thus detailed descriptions are not repeated hereinafter. The structure of the liquid crystal display panel shown in FIG. 5 is similar to that shown in FIG. 4 except that the light-shielding layer 250 is disposed on the first outer surface 202b of the substrate 202. Further, because the material and location of the light-shielding layer 250 are similar to those described in FIG. 5, detailed descriptions thereof are not repeated hereinafter.

When the liquid crystal display panel comprising the light-shielding layer 250 of the present embodiment (FIG.5) is applied to the liquid crystal display module, the light 260 emitted from the backlight module (not shown) can be shielded by the light-shielding layer 250 disposed on the first substrate 202 (shown in FIG. 6). In other words, the light-shielding layer 250 disposed on the first substrate 202 can shield the light leakage outside the display area 230. Therefore, the light leakage at the edges of the bezel 220 of the liquid crystal display module can be effectively reduced.

In an embodiment of the present invention, the thin film transistor array substrate comprises, for example but not limited to, bottom gate thin film transistors. However, the present invention is not limited thereto. According to an embodiment of the present invention, a low-temperature polysilicon thin film transistor process or any other active matrix liquid crystal display process may be applied for fabricating the liquid crystal display panel.

Third Embodiment

Figure 7:
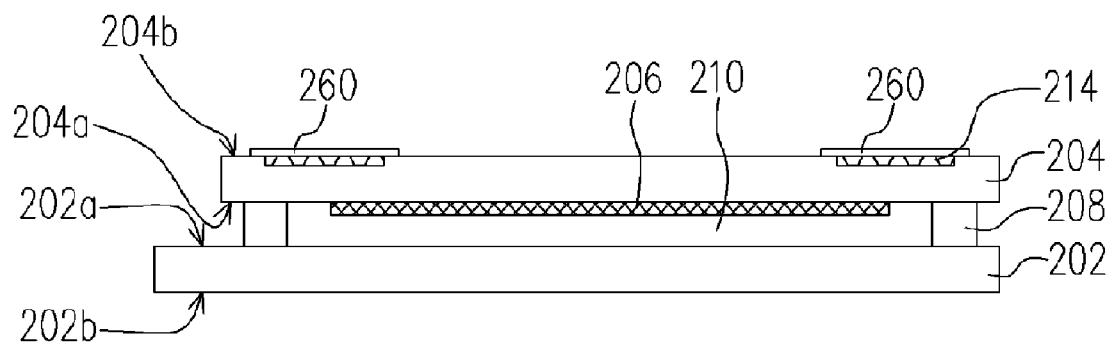
FIG. 7 is a cross-sectional view showing a liquid crystal display panel fabricated using an ODF process according to the third embodiment of the present invention.
Figure 8:
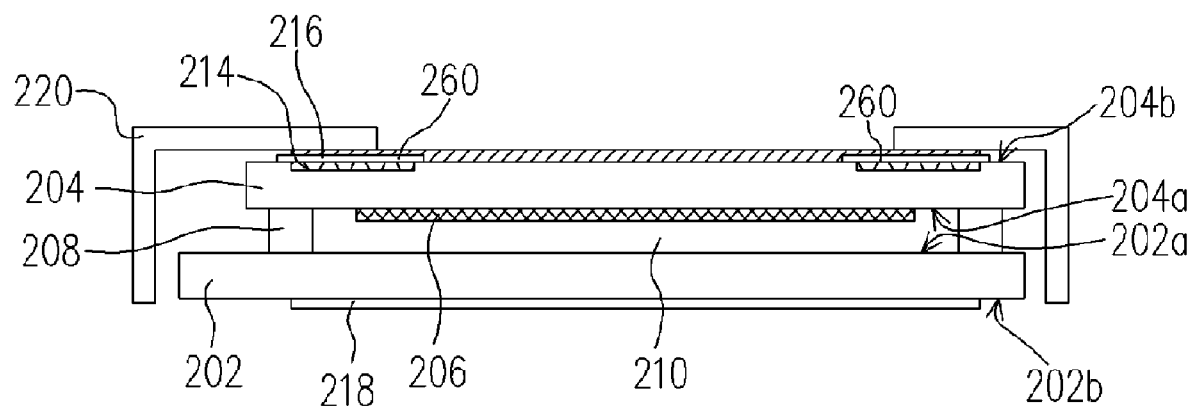
FIG. 8 is a cross-sectional view showing a liquid crystal display module fabricated using an ODF process according to the third embodiment of the present invention.

FIG. 7 is a cross-sectional view showing a liquid crystal display panel fabricated using an ODF process according to the third embodiment of the present invention. FIG. 8 is a cross-sectional view showing a liquid crystal display module fabricated using an ODF process according to the third embodiment of the present invention. With reference to FIG. 7 and FIG. 8. The structure of the liquid crystal display panel in FIG. 7 and FIG. 8 are similar to that in FIG. 2D except that a protection layer 260 is disposed on the light-shielding layer 214. In other words, the protection layer 260 is disposed between the polarizer 216 and the light-shielding layer 214. It should be noted that the light-shielding layer 214 is encapsulated by the protection layer 260. Therefore out-diffusion of dye within the light-shielding layer 214 is effectively prevented.

More specifically, the out-diffusion of dye within the light-shielding layer 214 results from a chemical reaction between the dye within the light-shielding layer 214 and an adhesive coated on one side of the polarizer 216. The out-diffusion of dye within the light-shielding layer 214 contaminates the display area of the liquid crystal display.

In an embodiment of the present invention, the protection layer 260 can be formed using an ink jet printing method, a screen printing method or a gravure printing method. The area of the protection layer 260 is, for example, larger than light-shielding layer 214 such that the light-shielding layer 214 does not have direct contact with the polarizer 216.

Fourth Embodiment

Figure 9:
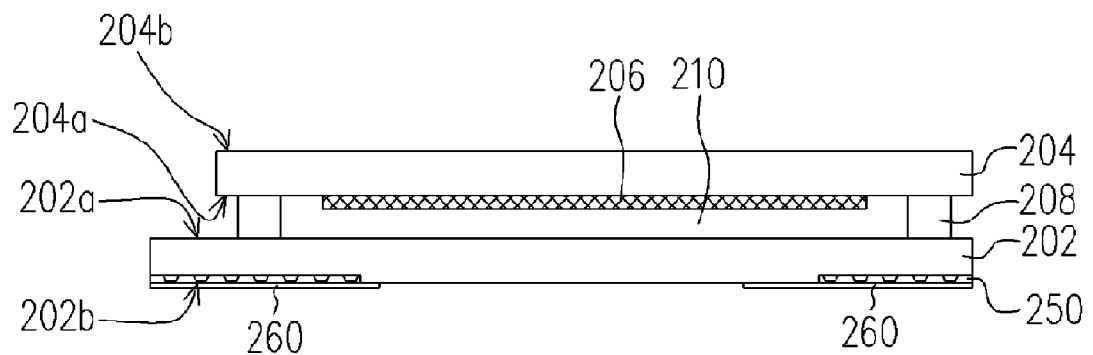
FIG. 9 is a cross-sectional view showing a liquid crystal display panel fabricated using an ODF process according to the fourth embodiment of the present invention.
Figure 10:
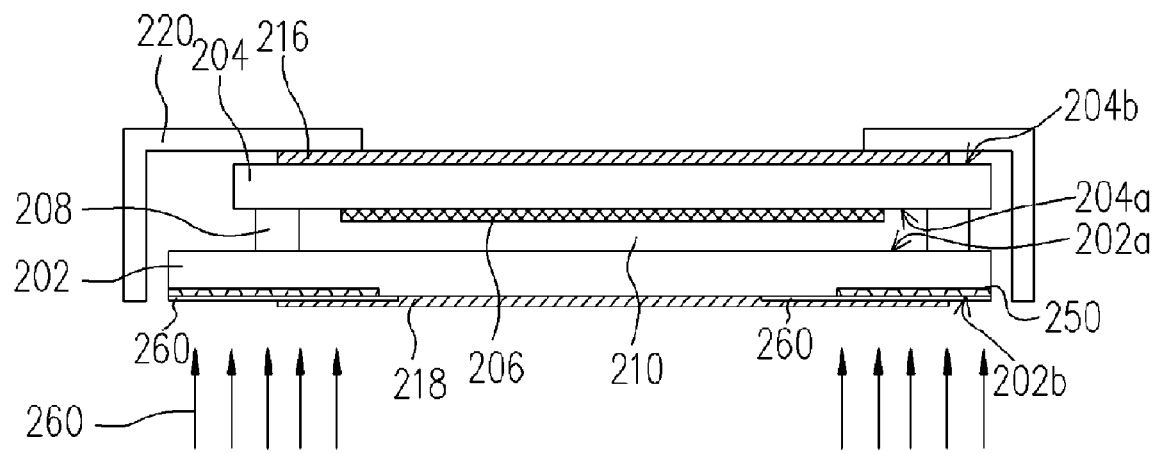
FIG. 10 is a cross-sectional view showing a liquid crystal display module fabricated using an ODF process according to the fourth embodiment of the present invention.

FIG. 9 is a cross-sectional view showing a liquid crystal display panel fabricated using an ODF process according to the fourth embodiment of the present invention. FIG. 10 is a cross-sectional view showing a liquid crystal display module fabricated using an ODF process according to the fourth embodiment of the present invention. Please refer to FIG. 9 and FIG. 10. The structure of the liquid crystal display panel in FIG. 9 and FIG. 10 are similar to that in FIG. 5 and FIG. 6 except that a protection layer 260 is disposed on the light-shielding layer 250. In other words, the protection layer 260 is disposed between the polarizer 218 and the light-shielding layer 250. It should be noted that the light-shielding layer 250 is encapsulated by the protection layer 260. Therefore, out-diffusion of dye within the light-shielding layer 250 is effectively prevented.

In an embodiment of the present invention, the protection layer 260 can be formed using an ink jet printing method, a screen printing method or a gravure printing method. The area of the protection layer 260 is, for example, larger than light-shielding layer 250 such that the light-shielding layer 250 does not have direct contact with the polarizer 218.

According to an embodiment of the present invention, the sealant is disposed on the first substrate 202 (for example, the thin film transistor array substrate). The liquid crystal layer is formed over the first substrate 202 within the sealed space defined by the sealant 208. However, the present invention is not limited thereto. The sealant 208 can be formed on the second substrate 204 (for example, the color filter substrate). The liquid crystal layer is formed over the second substrate 204 within the sealed space defined by the sealant 208.

According to an embodiment of the present invention, the black matrix layer is disposed on the second substrate 204 (for example, the color filter substrate). After the first substrate 202 is placed onto the second substrate 204, the edges of the second substrate 204 are exposed to light to cure the sealant 208 comprising the radiation-curable glue. However, the present invention is not limited thereto. The black matrix layer 206 can also be disposed on the substrate 202 (for example, the thin film transistor array substrate). Moreover, as long as the light-shielding layer 250 shields leakage light, the black matrix layer 206 and the light-shielding layer 250 can be disposed on the same substrate or on different substrates.

Accordingly, the present invention has following advantages: 1. In the present invention, the light-shielding layer is formed on the substrate. When the liquid crystal display panel is applied to the electronic product, the light-shielding layer is capable of shielding the light leakage at the edges of the bezel in the liquid crystal display module and thereby reducing the light leakage of the liquid crystal display module.

2. As to the method of fabricating the liquid crystal display panel using the ODF process, the light-shielding layer is formed on the substrate after the liquid crystal display panel is exposed to a light for curing the sealant. Therefore, the liquid crystal display panel can be fabricated using the ODF process fitting the SPGW specification, and also reduce the light leakage of the liquid crystal display module.

3. In the liquid crystal display panel of the present invention, contamination of the display area, which is caused by out-diffusion of dye within the light-shielding layer, is effectively prevented by the protection layer.

The foregoing description of the embodiments of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A liquid crystal display panel having a display area, comprising:

a first substrate having a first inner surface and a first outer surface;

a second substrate having a second inner surface and a second outer surface, wherein the second substrate is disposed above the first substrate;

a sealant, disposed between the first substrate and the second substrate;

a light-shielding layer, disposed on the first outer surface of the first substrate, wherein the light-shielding layer and the display area are not overlapped;

a first polarizer, disposed on the first outer surface;

a second polarizer, disposed on the second outer surface; and a protection layer, disposed between the first polarizer and the light-shielding layer, wherein the light-shielding layer is encapsulated by the protection layer.

2. The liquid crystal display panel of claim 1, wherein a material of the light-shielding layer comprises ink.

3. The liquid crystal display panel of claim 2, wherein the ink comprises black ink, deep-colored ink.

4. The liquid crystal display panel of claim 1, wherein an optical density of the light-shielding layer is 2.0 or higher than 2.0.

5. The liquid crystal display panel of claim 1, wherein the light-shielding layer is disposed on a peripheral area outside the display area.

6. The liquid crystal display panel of claim 1, further comprising a black matrix layer disposed on the first inner surface of the first substrate or the second inner surface of the second substrate.

7. The liquid crystal display panel of claim 6, wherein the light-shielding layer and the black matrix layer are partially overlapped.

8. The liquid crystal display panel of claim 7, wherein the light-shielding layer and the sealant are partially overlapped.

9. The liquid crystal display panel of claim 1, wherein the protection layer comprises pigment, resin or the combination thereof.

10. The liquid crystal display panel of claim 1, wherein the first substrate comprises a thin film transistor array substrate, and the second substrate comprises a color filter substrate.

11. The liquid crystal display panel of claim 1, wherein the first substrate comprises a color filter on thin film transistor array substrate (COA substrate), and the second substrate comprises an opposite substrate having a common electrode.

12. A method of fabricating a liquid crystal display panel having a display area, comprising:

providing a first substrate having a first inner surface and a first outer surface;

providing a second substrate having a second inner surface and a second outer surface;

forming a sealant between the first inner surface of the first substrate and the second inner surface of the second substrate;

filling a liquid crystal layer in a space defined by the first inner surface of the first substrate, the second inner surface of the second substrate and the sealant;

forming a light-shielding layer on the first outer surface of the first substrate;

attaching a first polarizer on the first outer surface; and attaching a second polarizer on the second outer surface, such that the protection layer is disposed between the first polarizer and the light-shielding layer.

13. The method of fabricating a liquid crystal display panel of claim 12, wherein a material of the light-shielding layer comprises ink.

14. The method of fabricating a liquid crystal display panel of claim 13, wherein the ink comprises black ink, deep-colored ink.

15. The method of fabricating a liquid crystal display panel of claim 12, wherein the light-shielding layer is formed using an ink jet printing method, a screen printing method or a gravure printing method.

16. The method of fabricating a liquid crystal display panel of claim 12, wherein an optical density of the light-shielding layer is 2.0 or higher than 2.0.

17. The method of fabricating a liquid crystal display panel of claim 12, wherein the light-shielding layer is disposed on a peripheral area outside the display area.

18. The method of fabricating a liquid crystal display panel of claim 12, further comprising a step of forming a protection layer to encapsulate the light-shielding layer.

19. The method of fabricating a liquid crystal display panel of claim 12, further comprising a step of forming a black matrix layer on the first inner surface of the first substrate or the second inner surface of the second substrate.

* * * * *